United States Patent
Hrastar et al.

(10) Patent No.: US 7,296,283 B2
(45) Date of Patent: Nov. 13, 2007

(54) TWO-TIERED AUTHORIZATION AND AUTHENTICATION FOR A CABLE DATA DELIVERY SYSTEM

(75) Inventors: Scott E. Hrastar, Duluth, GA (US); Roy A. Bowcutt, Alpharetta, GA (US)

(73) Assignee: Scientific Atlanta, Inc., Lawrenceville, GA (US)

(*) Notice: Subject to any disclaimer, the term of this patent is extended or adjusted under 35 U.S.C. 154(b) by 0 days.

(21) Appl. No.: 09/929,760

(22) Filed: Aug. 14, 2001

(65) Prior Publication Data

US 2001/0050979 A1 Dec. 13, 2001

Related U.S. Application Data

(63) Continuation of application No. 08/835,916, filed on Apr. 10, 1997, now Pat. No. 6,324,267.

(60) Provisional application No. 60/035,618, filed on Jan. 17, 1997.

(51) Int. Cl.
*H04N 7/16* (2006.01)

(52) U.S. Cl. .................. 725/30; 725/25; 725/109; 725/110

(58) Field of Classification Search ............. 379/93.02, 379/93.03, 102.02, 67.1, 68; 725/30, 25, 725/122, 110, 111, 114, 115–117, 126; 455/410, 455/411; 348/14.01, 14.08, 14.09; 370/401
See application file for complete search history.

(56) References Cited

U.S. PATENT DOCUMENTS

| | | | | |
|---|---|---|---|---|
| 4,186,380 A | * | 1/1980 | Edwin et al. | 714/4 |
| 4,533,948 A | * | 8/1985 | McNamara et al. | 380/211 |
| 4,780,757 A | * | 10/1988 | Bryer et al. | 725/144 |
| 4,814,972 A | * | 3/1989 | Winter et al. | 379/93.02 |
| 5,014,125 A | * | 5/1991 | Pocock et al. | 725/93 |
| 5,113,499 A | * | 5/1992 | Ankney et al. | 340/5.74 |
| 5,241,594 A | * | 8/1993 | Kung | 713/151 |
| 5,488,412 A | * | 1/1996 | Majeti et al. | 725/111 |
| 5,534,913 A | * | 7/1996 | Majeti et al. | 725/114 |
| 5,586,121 A | * | 12/1996 | Moura et al. | 370/404 |
| 5,608,446 A | * | 3/1997 | Carr et al. | 725/114 |
| 5,623,601 A | * | 4/1997 | Vu | 713/201 |
| 5,723,137 A | * | 3/1998 | Wahle et al. | 424/401 |
| 5,758,258 A | * | 5/1998 | Shoff et al. | 725/116 |
| 5,790,548 A | * | 8/1998 | Sistanizadeh et al. | 370/401 |
| 5,818,911 A | * | 10/1998 | Kawashima | 379/90.01 |
| 5,894,479 A | * | 4/1999 | Mohammed | 370/401 |
| 6,067,564 A | | 5/2000 | Urakoshi et al. | 725/2 |
| 6,163,272 A | * | 12/2000 | Goode et al. | 725/30 |
| 6,230,325 B1 | * | 5/2001 | Iinuma et al. | 725/110 |
| 6,324,267 B1 | * | 11/2001 | Hraster et al. | 379/93.02 |

* cited by examiner

*Primary Examiner*—Jason P. Salce

(57) ABSTRACT

Apparatus for a cable television subscriber to log onto a computer network with a modem over an upstream path using a USERID and password. The network validates the subscriber USERID and subscriber password with a stored database of valid USERIDs and associated passwords. After the USERID and password are validated, the modem then provides it electronic serial number to the network for validation against a stored database of authorized serial numbers. Upon additional validation of the modem's serial number, the subscriber is authorized to use the network.

31 Claims, 3 Drawing Sheets

TWO-TIERED AUTHORIZATION AND AUTHENTICATION FOR A CABLE DATA DELIVERY SYSTEM

CROSS-REFERENCE TO RELATED APPLICATION

This is a continuation of U.S. application Ser. No. 08/835,916, filed Apr. 10, 1997 now U.S. Pat. No. 6,324,267, which claimed the benefit of U.S. Provisional Application No. 60/035,618, filed Jan. 17, 1997.

BACKGROUND OF THE INVENTION

1. Technical Field

This invention relates to the field of cable data delivery systems and, more particularly, to a two-tiered authorization and authentication system for a cable delivery system.

2. Description of the Relevant Art

In the not-too-distant past, images could be processed and displayed only by large, special-purpose computer systems. Owners of lower-cost and less-powerful computers such as personal computers had to content themselves with character-based displays. The cost of memory has dropped so quickly and the power of microprocessors has increased so greatly in recent years, however, that modern personal computers are completely capable of processing and displaying images. Indeed, modern graphical user interfaces depend to a large extent on this capability.

Frustratingly enough for users of personal computers, the old problems with images have returned in another area, namely network computing. In network computing, the personal computer or work station is connected to a network and is able to use the network to fetch the data it is processing from remote locations. The most recent development in network computing is the Internet, a worldwide logical network which permits anyone who has access to the Internet to interactively fetch data including images from just about anywhere in the world. For example, using the Internet, it is possible to fetch pictures of the latest restoration projects in Florence, Italy from that city's home page on the World Wide Web.

The main drawback to interactively fetching data on the Internet is the length of time it takes to retrieve and display images. The problem is so serious that many people set up the program they use to access the Internet so that it does not fetch images. Doing this restricts the user to character data, but greatly decreases the time it takes to access information. The bottleneck in retrieving images from the Internet is not the personal computer, but rather the lack of capacity or bandwidth of the networks over which the images must be fetched. One part of the network where bandwidth is particularly restricted is the analog telephone line that connects most PC users to the Internet.

It has been known for years that the bandwidth of the telephone system can be increased by replacing the analog system with a digital system, but all of the known techniques for doing this require extensive modification of the telephone system.

A great many homes do in fact have a high bandwidth connection, namely that provided by cable television. The problem with this connection is that it is one way. A PC may receive data via a home's CATV cable, but it cannot use the cable to send data. Again, ways of making the CATV system bidirectional have been known for years. For example, in the early 1980's, Scientific-Atlanta, Inc. introduced and marketed a product known as the Model 6404 Broadband Data Modem for use with bidirectional CATV systems.

Scientific-Atlanta, Inc. has also recently filed U.S. patent applications Ser. Nos. 08/627,062, filed Apr. 3, 1966, 08/738,6681, filed Oct. 16, 1996, and a continuation-in-part titled System and Method for Providing Statistics for Flexible Billing in a Cable Environment, Koperda, et al., filed Mar. 14, 1997 which describe bidirectional CATV systems. As with the telephone systems, the problem here is not the technology, but the fact that its introduction requires extensive modification of most existing CATV systems.

Given that many homes have a CATV cable and virtually all homes have an analog telephone line, systems have been proposed in which the CATV cable is used to send data from the Internet to the PC and the telephone line used to return data from the PC to the Internet. These systems take advantage of the fact that by far the most common pattern of interaction between users and networks is for the user to retrieve a large amount of data over the network, for example an image of a restored art work from Florence, examine the image, and then send a few keystrokes over the network. With this kind of interaction, far less bandwidth is needed in the channel that is used to return the keystrokes than in the channel that is used to fetch the image.

An example of such a system is the one disclosed in Moura, et al., *Asymmetric Hybrid Access System and Method*, U.S. Pat. No. 5,586,121, issued Dec. 17, 1996, and in Moura, et al., Remote Link Adapter for use in TV Broadcast Data Transmission System, U.S. Pat. No. 5,347,304, issued Sep. 13, 1994, In this system, the head end of a cable system has high bandwidth access to the Internet or to other networks and access via CATV cables and the telephone system to households or businesses with PCs. Data received from these networks is sent to PCs connected to the cable system's cables and responses from the PCs are collected via the telephone system and sent to the network. In the home or business, the PC is connected either directly or via a local area network to a device which includes both a radio frequency modem and a standard analog telephone modem. The radio frequency modem is connected to the CATV cable. It receives and decodes the data sent on the CATV cable and provides it to the PC. The telephone modem is connected to a standard telephone line. It receives data from the PC and sends it to the CATV head end, which in turn forwards it to the Internet or other networks.

While systems such as the one disclosed in the Moura references do provide a solution to the bandwidth problem, they have a number of deficiencies, particularly when used in the context of the Internet. Among the deficiencies are the following:

The system of Moura wastes Internet Protocol (IP) addresses for the computers attached to the modem. IP addresses are in short supply. In the system of Moura, however, IP addresses are statically assigned to the PCs and are consequently not available for reuse when a PC is idle or not engaged in an activity which involves network access.

From the point of view of the Internet, the system of Moura is a link level system, that is, the components of the system of Moura do not themselves have IP addresses and cannot themselves execute IP protocols. In particular, IP routing is not used within the system of Moura. One difficulty arising from this situation is that IP routing is centralized in the IP router that connects the head end to the Internet; another is that the modem in the system of Moura cannot function as an IP router.

In Moura, the telephone connection to the modem is used solely to transfer data from the PC and modem to the head end. All data received by the PC and modem is sent via the CATV cable. Consequently, when the CATV system fails, the PC is left without a connection by which it can receive data. This situation is made even less desirable by the fact that CATV systems are far more likely to fail than the telephone system.

The CATV channel to which the modem of Moura responds is statically assigned to a given modem, thereby rendering the channel unavailable for use by other modems when the PC connected to the given modem is idle or is not engaged in an activity which involves network access.

The Moura system is further deficient in that it does not have adequate provisions for preventing unauthorized use of the system. Thus, the system is subject to revenue loss for the system provider. Such losses result in an overall increase in the operating cost of the system, which ultimately must be passed on to the authorized subscribers.

Accordingly, there is a great need for a system like the one disclosed by Moura, but which is not burdened by the aforementioned deficiencies.

SUMMARY OF THE INVENTION

In accordance with the principles of the present invention, there is provided a cable data delivery system in which the downstream data delivery system is provided over an existing cable television distribution network and the upstream path from a subscriber is provided over a standard telephone line. A special modem, described below, is used to interface the upstream and downstream paths.

In accordance with the invention, a subscriber uses the modem to log onto the system over the upstream path using a USERID and password. The system then validates this information with a stored database of valid USERIDs and associated passwords. After the USERID and password are validated, the modem then initiates an interaction with the system control server over the upstream telephone path. During this interaction, the modem sends it electronic serial number to the control server for validation along with a request for the system to allocate system resources so that the modem can receive high data rate transmissions over the cable television distribution system down stream path. The modem's electronic serial number is also compared with a stored database of valid serial numbers for validation. The subscriber will not be authorized to use the entire system unless the USERID, password and modem serial number share shown to be valid for the particular user.

Thus, the system of the present invention provides two tiers of authorization and authentication. The first tier, validation of the subscriber's USERID and password, are required for the subscriber to establish the initial telephone connection with the system. In one embodiment of applicant's system, establishment of the initial telephone connection over the telephone line is sufficient for the user to conduct, for example, an Internet session as is currently done in the prior art with a conventional modem and a convention telephone connection. This level of service does not, however, utilize the full features of Application's invention with respect to providing high data rates back to the subscriber over the cable television network. The higher level of service requires the second tier of authorization involving the validation of the electronic serial number.

The two tier authorization and authentication approach employed in the present invention results in a significant level of security for the system, thus preventing unauthorized use of the system and the resulting loss in revenue for the system provider. Needless to say, resulting losses due to unauthorized use of the system ultimately results in higher cost for the subscriber as well.

Further details and features of the present invention will be understood from reading the detailed description of the invention in view of the drawings.

BRIEF DESCRIPTION OF THE PREFERRED EMBODIMENT

Figure 1:
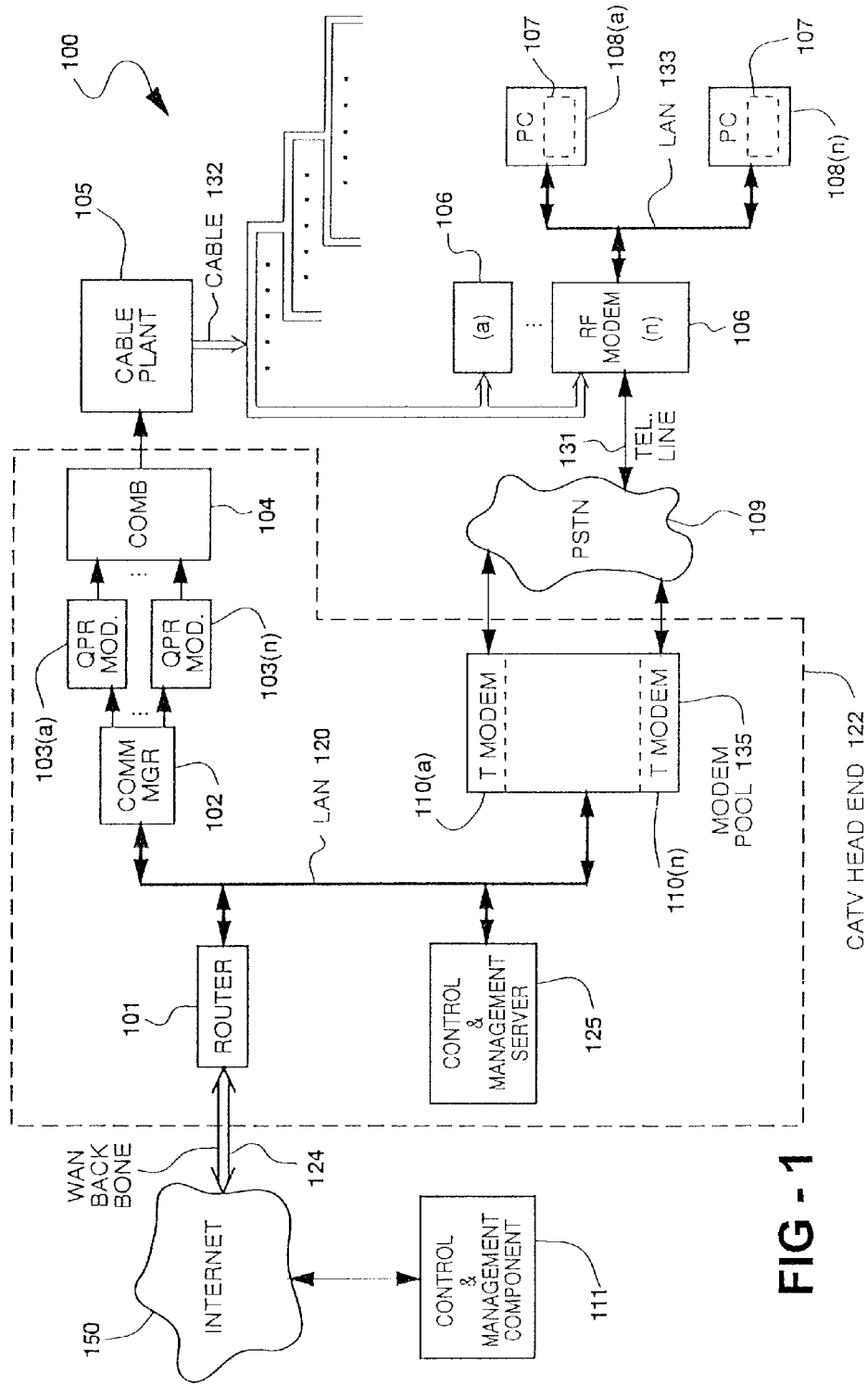
FIG. 1 is an overview of the physical components of the cable data network disclosed herein.

FIG. 1 shows the physical components of cable data network 100 in a preferred embodiment. Cable data network 100 transfers data packets with IP addresses between Internet 150 and hosts 108, which in a preferred embodiment are PCs or work stations. Cable data network 100 also transfers packets with IP (Internet Protocol) addresses among the components of cable data network 100 and uses Internet 150 to exchange data packets with IP addresses between cable data network 100 and remotely-located control and management components 111. These components typically deal with functions such as receiving information about new subscribers or billing.

In a preferred embodiment, cable data network 100 is implemented in a cable television (CATV) system. Packets from Internet 150 that contain the IP address of a host 108(i) are received in CATV head end 122, are put in the proper form for transmittal over cable 132 belonging to the CATV system, and are transmitted via cable 132 to RF modem 106(j) to which destination host 108 (i) is attached. RF modem 106(j) reads the IP address of host 108 from the packet and routes the packet to host 108(i). Packets from host 108(i) which are intended for a destination in Internet 150 go to RF modem 106(j), which routes them via telephone line 131 and public switched telephone network (PSTN) 109 to a telephone modem (Tmodem) 110(k) in telephone modem pool 135 in head end 122. Tmodem 110(k) routes the packet to router 101, which routes it to Internet 150. Since public switched telephone network 109 allows bidirectional communication, router 101 may also route packets received from Internet 150 for host 108(i) to host 108(i) via tmodem 110(k) and RF modem 106(j). As will be explained in more detail in the following, this route is used in the event of a failure in the CATV portion of network 100.

Continuing with the details of the implementation of cable data network 100, data packets are transferred between Internet 150 and CATV head end 122 by means of a transmission medium belonging to a wide-area backbone network 124. Typically, the transmission medium will be a high-speed, high-capacity fiber optic cable such as a T1 or T3 cable, but it could also be a terrestrial or satellite microwave link. The transmission medium is connected to router 101, which in a preferred embodiment may be a router belonging to the 7000 series manufactured by Cisco Systems, Inc., San Jose, Calif.

Router 101 is coupled between WAN backbone 124 and local-area network (LAN) 120, which is the link-level network that connects the components of cable data network 100 which are located in CATV head end 122. Router 101 may both receive packets from backbone 124 or LAN 120 and provide them to backbone 124 or LAN 120. Each component connected to LAN 120 has both an IP address and a LAN address on LAN 120, and router 101 contains a routing table which it uses to route IP packets to IP hosts, including other routers. Router 101 examines every packet it receives on WAN backbone 124 or LAN 120; if the packet's destination IP address is one of the ones in the routing table, router 101 routes it to the component on LAN 120 which is to receive IP packets having that address; if it is not one of the addresses in the routing table, router 101 routes it to WAN backbone 124, which takes it to Internet 150. In each case, router 101 puts the data packet into the proper form to be transmitted via the relevant link-level network.

As will be apparent from the foregoing discussion, LAN 120 and router 101 can be used to route IP packets received from Internet 150 and destined to a host 108 via two routes. The first is via communications manager 102 and cable plant 105, cable 132, and RF modem 106. The second is to host 108 via telephone modem pool 135 and RF modem 106. Packets from host 108 and from RF modem 106 go via telephone modem pool 135 and LAN 120 to router 101. In other embodiments, it may also be possible to route packets addressed to RF modem 106 via the first route. Router 101 can finally route packets via Internet 150 between the components in head end 122, hosts 108, RF modems 106, and control and management component 111.

Figure 2:
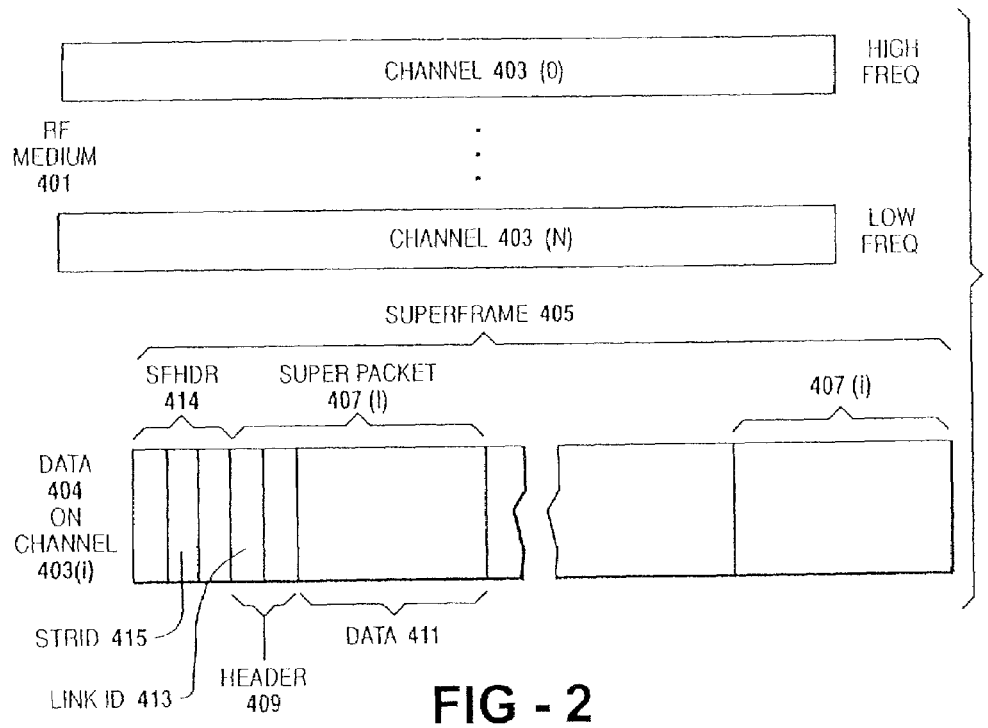
FIG. 2 shows the channels, superframes, and superpackets used to carry data on the RF link in the preferred embodiment.

When packets are to go to a host 108 via cable 132, they are routed to communications manager 102, which puts the packets into the proper form for transport by that link-level network. FIG. 2 shows how data is transported on cable 132 in a preferred embodiment. Cable 132 is an RF medium 401 which carries data in a fixed number of channels 403. Each channel 403 occupies a portion of the range of frequencies transported by cable 132. Within a channel 403($i$), data moves in superframes 405. Each superframe contains a superframe header 414 and a fixed number of fixed-sized superpackets 407. The only portion of the superframe header that is important to the present discussion is stream identifier (STRID) 415, which is a unique identifier for the stream of data carried on channel 403. The combination of a channel's frequency and the stream identifier 415 uniquely identifies the network to which cable 132 belongs in the CATV system. As will be explained in more detail later, this unique identification the network cable 132 belongs to is used by communications manager 102 to determine which network should receive the IP packets intended for hosts 108 connected to a given RF modem 106($i$).

Each superpacket 407 contains a header 409 and data 411. The header contains a link identifier (LinkID) 413 in cable network 132 for an RF modem 106. The number of superpackets 407 is the number of pipes in channel 403($i$). When a given RF modem 106($i$) is active, it is associated with a <channel,pipe,link ID> triple, that is, the RF modem 106($i$) is tuned to the channel 403($j$) specified in the triple and watches the superpackets that belong to the pipe specified in the triple. For example, if the RF modem is associated with pipe 3, it watches superpacket 407(3) in superframe 405, and if superpacket 407(3)'s header 409 contains RF modem 106($i$)'s Link Id 413, RF modem 106($i$) reads data 411 from superpacket 407(3). The <chanel,pipe,LinkID> triple is thus the link address of RF modem 106($i$) on cable 132. Data 411 is of course all or part of an IP packet 301. If the IP address of packet 301 specifies a host 108 connected to RF modem 106($i$), RF modem 106($i$) routes it to that host 108.

Returning to communications manager 102, that component receives IP packets 301 addressed to hosts 108 connected to networks whose link layers are cables 132 connected to head end 105 and routes them to the proper RF modems 106 for the hosts. It does by relating the IP address of an active host 108 to one of the networks and within the network to a <channel,pipe,linkID> triple specifying the RF modem 106 to which the host 108 is connected. As employed in the present context, an active host is one that currently has an IP address assigned to it. Using the information in the routing table, communications manager 102 makes superframes 405 for each channel 403($i$) in the network containing cable 132. The superframes contain superpackets 407 directed to the RF modems 106 connected to that channel for which communications manager 102 has received IP packets 301. The superframes are stored in a dual-ported memory which is accessible to QPR modulators 103.

There is a QPR modulator 103 for each channel 403 in a given network, and the QPR modulator reads the superframes for its channel, digitally modulates the RF signal for the channel according to the contents of the superframes, and outputs the modulated signal to combiner104, which combines the outputs from all QPR modulators and provides the combined output to cable plant 105, which outputs it to cables 132 belonging to the network. The QPR modulators employ quadrature partial response modulation. Of course, any kind of digital RF frequency modulation could be employed as well. It should also be pointed out that any arrangement could be employed which relates a given RF modem 106 to a portion of the bandwidth of the network to which cable 132 belongs, rather than the <channel,pipe,LinkID> triple used in the preferred embodiment, and that the portion of the bandwidth that carries packets addressed to hosts 108 connected to a given RF modem 106 can be termed in a broad sense the RF modem's "channel".

Following cable 132 to RF modem 106, RF modem 106 is connected between cable 132, a LAN 133 to which one or more hosts 108 are connected, and telephone line 131 and provides interfaces to cable 132, LAN 133, and telephone line 131.

Figure 3:
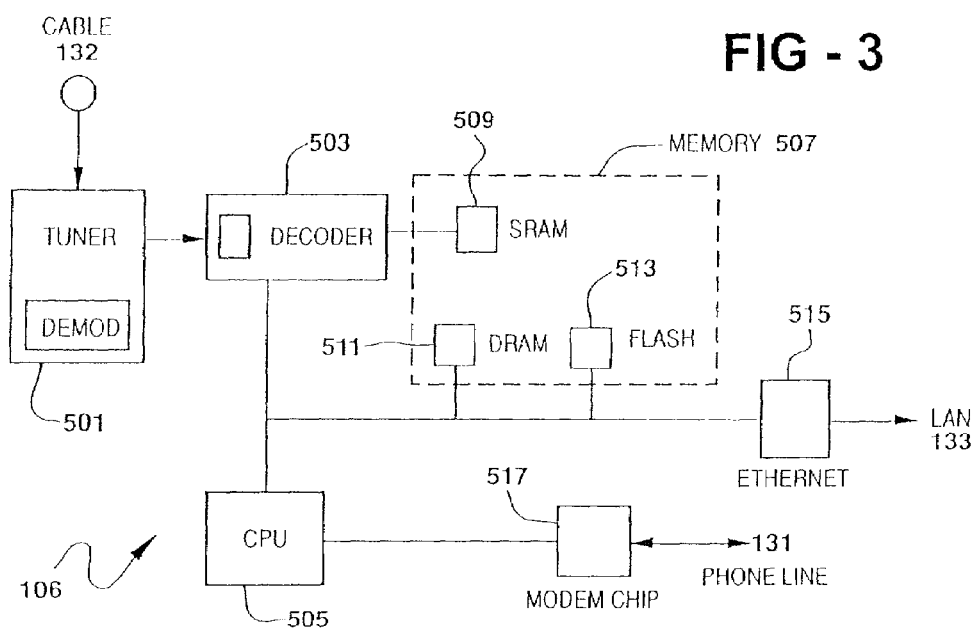
FIG. 3 is a block diagram of a preferred embodiment of the RF modem employed in the cable data network.

FIG. 3 shows a block diagram of a preferred embodiment of RF modem 106. The components of RF modem 106 operate under control of CPU 505 and read data from and write data to memory 507, which has three kinds of memory components: static RAM 509, which is nonvolatile, that is, it is writable but retains its contents when RF modem 106 is turned off, dynamic RAM 511, which is volatile, and FLASH RAM 513, which is nonvolatile and writable but will only permit a fixed number of writes. SRAM 509 is used to store data which changes but must be kept across activations of RF modem 106. Examples of such data are the RF modem's telephone number and the addresses of RF modem 106 and hosts 108 on LAN 133. DRAM 511 is used for data that is only valid during an activation, such as the current routing table. FLASH RAM 513 is used for information that changes only rarely, such as the programs executed by CPU 505. In the preferred embodiment, RF modem 106 can load programs it receives in IP packets via telephone line 131 into Flash RAM 513.

Turning to the interfaces and beginning with the interface to cable 132, that interface has two main components, tuner 501 and decoder 503. Tuner 501 can be tuned under control of CPU 505 to a channel 403($i$) in cable 132. Tuner 501 further demodulates the superframes 405 it receives on that channel and passes them to decoder 503. Decoder 503 examines superpacket 407($i$) for the pipe which carries data addressed to RF modem 106, and if LinkID 413 in superpacket 407($i$) specifies RF modem 106, decoder 503 does error correction, decodes the data, and passes it to memory 507. When an IP packet has accumulated in memory 507, CPU 505 examines the destination IP address in the packet, and uses a routing table in memory 507 to determine whether the packet is addressed to a host 108 connected to RF modem 106. If the packet is so addressed, CPU 505 obtains the LAN address corresponding to the IP address. CPU 505 provides the LAN address and the location of the packet in memory 507 to Ethernet integrated circuit 515, which packages the packet into one or more Ethernet frames and outputs it to Ethernet 133.

RF modem may also receive IP packets via phone line 131 and modem chip 517 that are addressed either to the RF modem 106 itself or to one of the hosts 108 connected to RF modem 106. In the first case, RF modem 106 responds to the packet; in the second, it routes the packet to the host as just described for packets from cable 132. When RF modem 106 receives a packet via LAN 133 that is not addressed to RF modem 106 itself, it routes the packet via modem chip 517 and telephone line 131. Included in host 108 is the software 107 necessary to interact with RF modem 106.

Continuing with the portion of the link level that is implemented using the public switched telephone network, modem chip 517 in RF modem 106 is connected by means of a standard analog telephone line 131 to public switched telephone network 109, and RF modem 106 can thus call other telephone numbers via PSTN 109 and be called from other telephone numbers in PSTN 109. In the present case, when RF modem 106 wishes to set up a session that will permit it to transfer IP packets 301 for a host 108, it calls a telephone number for telephone modem pool 135. The modem pool responds by assigning a telephone modem (Tmodem) 110 to RF modem 106 and assigning RF modem 106 an IP address. As shown in FIG. 1, telephone modem pool 135 is also connected to LAN 120 in head end 122. Telephone modem pool 135 serves as a router with respect to LAN 120 and the telephone connections currently being served by the tmodems 110 in the modem pool. Once a telephone modem 110 and an IP address have been assigned to RF modem 106, RF modem 106 may send IP packets 301 to the devices connected to LAN 120 and receive IP packets 301 from those devices.

As will be explained in more detail in the following, the fact that PSTN 109 provides a bidirectional link between the devices connected to LAN 120 and RF modem 106 is employed to determine where RF modem 106 is in the cable network managed by head end 122, to dynamically assign a <channel,pipe,LinkID> triple in cable 132 to RF modem 106, and to provide an alternate route to hosts 108 connected to RF modem 106 when there is a failure in the RF link between head end 122 and RF modem 106.

The remaining device which is connected to LAN 120 is control/management server 125, which in a preferred embodiment is implemented in software executing on a server constructed by SUN Microsystems, Inc., Mountain View, Calif. Control/management server 125 manages CDN 100. It responds to DHCP packets by dynamically allocating IP addresses to hosts 108 and sending SNMP packets to router 101 and communication manager 102 which cause them to set their routing tables as required for the newly-assigned IP addresses, responds to SNMP trap packets from the devices connected to LAN 120 and from FR modems 106, responds to RIP packets as required to update routings, and maintains the Management Information Database used by the SNMP protocol as well as a list of unassigned IP addresses. A graphical user interface in control/management server 125 shows the current status of CDN 100 and permits operator intervention in the operation of cable data network 100.

The structure of an IP packet, IP address routing architecture and addressing architecture of CDN 100 are described in U.S. application Ser. Nos. 08/833,198, filed Apr. 14, 1997; 08/837,073, filed Apr. 11, 1997; U.S. Pat. No. 6,208,656, filed Apr. 11, 1997; U.S. Pat. No. 6,178,455, filed Apr. 11, 1997; U.S. application Ser. No. 08/838,833, filed Apr. 11, 1997; 08/832,714, filed Apr. 11, 1997 and U.S. Pat. No. 6/249,523 filed Apr. 11, 1997 and are incorporated herein by reference. These applications will be collectively referred to hereafter as the "incorporated applications." In addition, details on IP addressing and the protocols of the TCP/IP protocol suite can be found in W. Richard Stevens, TCP/IP Illustrated: The Protocols, Addison-Wesley, 1994, which also is hereby incorporated by reference.

A problem in the design of networks that employ IP addresses is that the IP addresses are only 32 bits long. The maximum number of address is consequently $2^{32}$, and the enormous growth of the Internet has resulted in a shortage of IP addresses. One of the techniques that cable data network 100 employs to reduce the number of IP address needed in cable data network 100 is the dynamic assignment of IP addresses to hosts 108 in network B and of the <channel,pipe,link ID> triples used to specify destinations of data in cable 132 to RF modems 106($j$). By dynamic assignment is meant here that the IP addresses in a given subnetwork C and the <channel,pipe,link ID> triple listened to by RF modem 106($j$) are assigned to RF modem 106($j$) for the period of time that RF modem 106($j$) is active. When RF modem 106($j$) is not active, the IP addresses are available for assignment to other hosts 108 and the <channel,pipe,link ID> triple is available for assignment to another RF modem 106(k). Since only a small percentage of hosts 108 is active at a given time, dynamic assignment makes it possible to share a relatively small number of IP addresses and <channel,pipe,link ID> triples among a much larger number of users. It should be further noted here that the binding between a <channel,pipe,link ID> triple and the set of IP addresses is also dynamic, i.e., what IP addresses correspond to a given <channel,pipe,link ID> triple is decided only when the IP addresses and the <channel,pipe,link ID> triple are assigned.

A more detailed description of dynamic assignment of IP addresses can be found in the incorporated applications.

Figure 4:
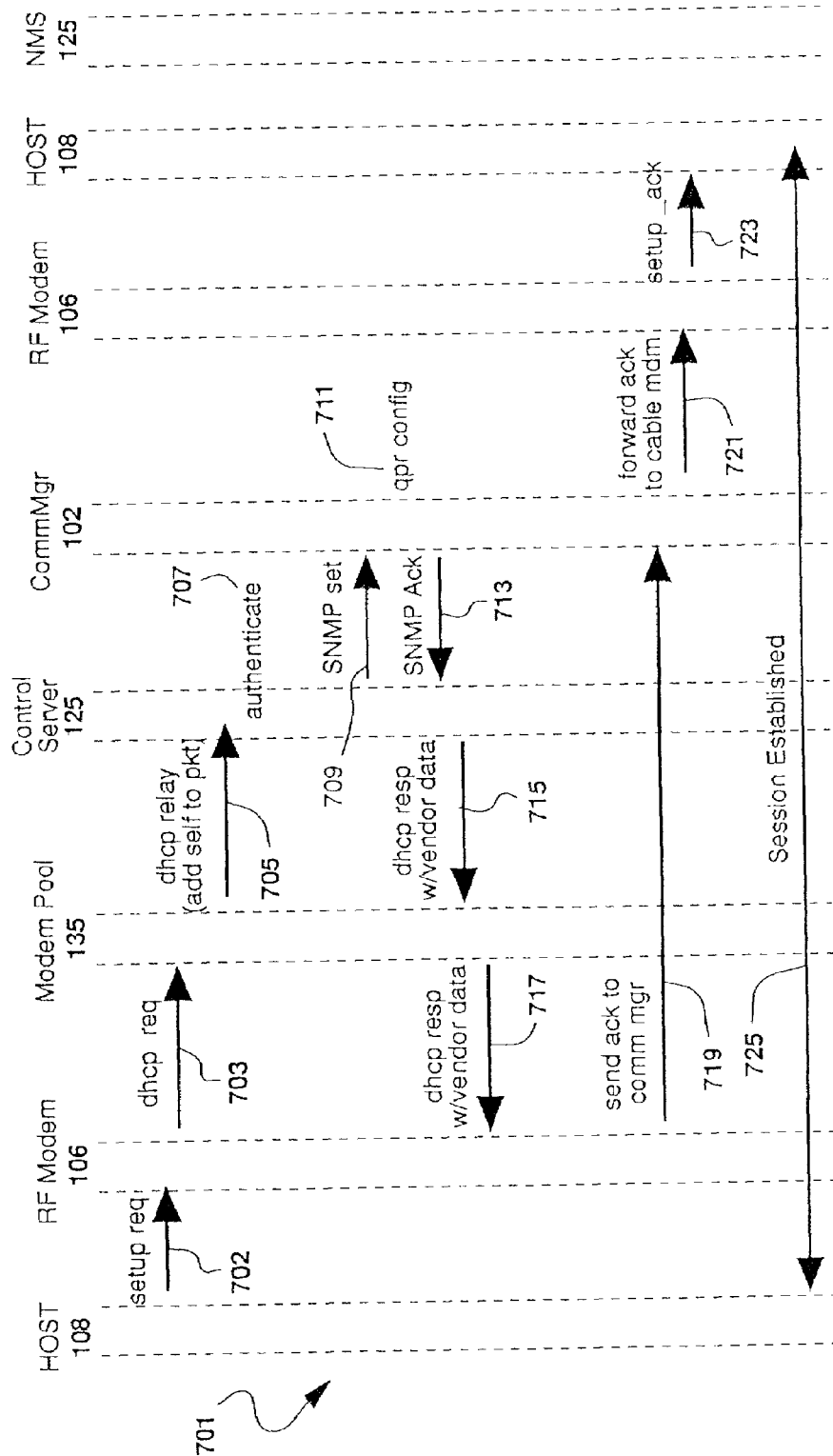
FIG. 4 is a diagram that shows how the RF modem receives IP addresses and a <channel,pipe,link ID> triple when the RF modem becomes active.

FIG. 4 shows the interactions 701 between the components of cable data network 100 when a RF modem 106($i$) is inactive and a user of host 108($j$) connected to RF modem 106($i$) wishes to become connected to Internet 150. The user executes routines in software 107 which cause host 108($j$) to send a setup request to RF modem 106($i$) at modem 106($i$)'s address in LAN 133, as shown at 702. Included in the setup request is authentication information such as a user identification and password and the telephone number of telephone modem pool 135. RF modem 106 responds by first sending a dummy IP address to host 108($j$) and then dialing the telephone number. Telephone modem pool 135 responds by setting up a Point-to-Point Protocol (PPP) link via PSTN 109 between RF modem 106 and a tmodem 110(k). Once this is done, RF modem 106 sends the authentication information to modem pool 135, which passes them on to control/management server 125. Control management server 125 then checks the authentication information, and if it is valid, control/management server 125 assigns an IP address in network A to RF modem 106(*i*). It returns the IP address to RF modem 106(*i*). RF modem 106(*i*) can now use TCP/IP protocols to communicate with the head end devices connected to LAN 120.

RF modem 106(*i*) must next obtain an IP address for host 108(*j*) and the <channel,pipe,Link ID> triple which it is to receive packets addressed to host 108(*j*)'s IP address on cable 132. To do this, it sends a DHCPOFFER IP packet 703 to modem pool 135. Included in the vendor-encapsulated options portion of the protocol are the IP address of RF modem 106(*i*) and a <frequency, streamID 405> pair which RF modem 106(*i*) obtains by listening to any frequency on cable 132. As explained earlier in the discussion of superframes 405, the <frequency,streamID> pair uniquely identifies which cable 132 RF modem 106(*i*) is connected to.

Modem pool 135 receives DHCPOFFER packet 703, adds modem pool 135's IP address to it, and broadcasts the packet on net A. DHCP server in Control/management server 125 responds to packet 705 and assigns IP addresses to the hosts 108 attached to RF modem 106(*j*) and a <channel,pipe,link ID> triple to RF modem 106 as described above.

Next, control/management server 125 sends a DHCPOFFER packet 715 addressed to RF modem 106's IP address. This is routed to modem pool 135. The OFFER packet contains the following information:
- Range of IP addresses for the hosts 108 connected to RF modem 106.
- An IP address for RF modem 106 in Ethernet 133. As will be explained in more detail below, this IP address is not unique to RF modem 106.
- the subnet mask for the host IP addresses.
- IP addresses in network A for a domain name server, for SNMP agent, for communications manager 102, and for router 101.
- Information about where RF modem 106 can obtain current firmware.
- The <channel,pipe, link ID> triple that has been assigned to RF modem 106.

Telephone modem pool 135 forwards the DHCP response packet to RF modem 106(*i*) (717) and RF modem 106(*i*) sets its tuner 501 to listen on the specified frequency and its decoder 503 to read superpackets on the specified pipe when they have the RF modem's link ID.

When RF modem 106(*i*) next receives a DHCPDISCOVER request from any of the IP hosts 108 attached to LAN 133, it responds with a DHCPOFFER packet that contains one of the IP addresses for the hosts that RF modem 106(*i*) received by the process described above.

In other embodiments, RF modem 106(*i*) may further respond to the DHCP OFFER packet by sending an acknowledgment IP packet via PSTN 109 and modem pool 135 to communications manager 102 (719). Communications manager 102 responds to the acknowledgment by sending an acknowledgment 721 on the cable 132 at the frequency and pipe RF modem 106(*i*) is listening to. The acknowledgment contains at least RF modem 106(*i*)'s LinkID. Once RF modem 106(*i*) receives the acknowledgment, it informs host 108(*i*) which began the transaction of its new IP address. Host 108(*i*) then replaces the dummy IP address with the new IP address.

The authorization and authentication process in accordance with the present invention will now be further described with reference again to FIG. 1.

When a subscriber wishes to initiate a network session, modem 106 is powered up. Upon power up, the modem performs a set of self tests to verify the hardware. After a successful completion of the self tests, the modem is ready to receive commands from the network access software resident in the PC. The subscriber then launches the network Access software which opens a logon dialog box on the PC screen requesting the subscriber's USERID, password and telephone number to dial in order to connect with modem pool 135. Ideally, the subscriber's USERID, password and telephone number will be stored in a configuration file associated with the network access software from an earlier session. Thus, when the logon dialog box is displayed, it may already have this information available for the subscriber to review and update if necessary.

The PC then sends the logon information (USERID, password and telephone number) to the cable modem. The modem then dials modem pool 135 over PSTN 109 and requests access using the USERID and password. Modem pool 135 forwards the access request to control and management component 111 which performs the actual authentication and replies to modem pool 135 with an "accept" or "reject" command. This command is then forwarded on to modem 106.

In the case of a "reject" the subscriber is not permitted further use of the system. In the case of an "accept", a bidirectional control path is established between modem 106 and modem pool 135, thereby completing the first tier of the authorization and authentication process. At this stage, the subscriber may, depending on the type of service levels provided by the service provider, conduct, for example, an Internet session as is currently done in the prior art with a conventional modem and a conventional telephone connection.

In a full service operation, however, once the subscriber USERID and password are validated and an authorized telephone connection is established between modem 106 and modem pool 135, modem 106 sends to control and management component 111 its electronic serial number and a request for an allocation of system resources so that the modem can receive high data rate transmissions over cable plant 105. Control and management component 111 compares the serial number with a stored database of authorized serial numbers. Upon a match, the second tier of the authorization and authentication process is completed and appropriate system resources are allocated for modem 106 as described above.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. In a cable data delivery network for delivering digital data to a host location upon a subscriber initiated request, an apparatus for authenticating that the subscriber is authorized to use said network, said apparatus comprising:
   a network manager including at least one database of authorized users and authorized unique identifiers for each of a plurality of authorized data communication devices and a validation agent, said validation agent further comprising:
   a logic to authorize the subscriber to access a first communications path by comparing first subscriber authentication information received from a data communication device associated with the host location with at least part of the at least one database comprising the authorized users, the first communications path providing at least a portion of connectivity between the host location and a head end of the cable data delivery network; and logic to authorize the subscriber to access a second communications path, responsive to the first communications path authorization, by comparing a unique identifier of the data communication device that is received from the data communication device with at least part of the at least one database comprising the authorized unique identifiers for each of the plurality of data communication devices, the second communications path providing at least a portion of connectivity between the host location and the head end of the cable data delivery network, wherein the second communications oath is uni-directional.

2. The apparatus of claim 1, wherein said first subscriber authentication information includes a subscriber USERID.

3. The apparatus of claim 2, wherein said first subscriber authentication information further includes a subscriber password.

4. The apparatus of claim 3, wherein said at least one database includes an associated USERID and password for each of said authorized users.

5. The apparatus of claim 4, wherein said validation agent authorizes said subscriber to use said first communications path in accordance with a comparison of said subscriber USERID and said subscriber password to USERIDS and passwords stored in said at least one database.

6. The apparatus of claim 5, wherein said data communication device associated with the host location includes a dial up device that further includes a cable data receiver for receiving said digital data.

7. The apparatus of claim 6, wherein said dial up device is uniquely identified by the unique identifier that comprises an electronic identifying number, and wherein the unique identifier that is received from the data communication device includes the electronic identifying number.

8. The apparatus of claim 7, wherein said at least one database further includes authorized identifying numbers for each of a plurality of dial up devices including said dial up device.

9. The apparatus of claim 8, wherein said validation agent authorizes said dial up device to receive said digital data over the second communications path in accordance with a comparison of said identifying number of said dial up device with said identifying numbers stored in said at least one database.

10. The apparatus of claim 1, wherein the first communications path is a public switched telephone network (PSTN) link.

11. The apparatus of claim 1, wherein the first communications path is bi-directional.

12. The apparatus of claim 1, wherein the second communications path is a radio frequency (RF) cable link.

13. The apparatus of claim 1, wherein the data delivery is restrained until authorization is completed.

14. The apparatus of claim 1, wherein the first subscriber authentication information comprises a password provided to the validation agent by the subscriber and the unique identifier of the data communication device is a number provided to the validation agent by the data communication device associated with the host.

15. A method of authorizing a subscriber to access a first communications path and a second communications path, the first communications path and the second communications path utilized in conveying data between a head end of a cable data delivery network and a data communication device associated with the subscriber of the cable data delivery network, the method comprising the steps of:

authorizing the subscriber to access the first communications path by comparing first subscriber authentication information received from the data communication device with at least part of at least one database of authorized users, the first communications path providing at least a portion of connectivity between the data communication device and the head end of the cable data delivery network; and authorizing the subscriber to access the second communications path, responsive to the first communications path authorization, by a unique identifier of the data communication device that is received from the data communication device, with at least part of the at least one database that further includes authorized unique identifiers for each of a plurality of authorized data communication devices, the second communications path providing at least a portion of connectivity between the data communication device and the head end of the cable data delivery network, wherein the second communications path is uni-directional.

16. The method of claim 15, wherein the first subscriber authentication information comprises a USERID and a password.

17. The method of claim 15, wherein the unique identifier of the data communication device comprises an electronic identifying number.

18. The method of claim 15, wherein the first communications path is a public switched telephone network (PSTN) link.

19. The method of claim 15, wherein the first communications path is bi-directional.

20. The method of claim 15, wherein the second communications path is a radio frequency (RF) cable link.

21. The method of claim 15, wherein the data conveyance is restrained until authorization is completed.

22. The method of claim 15, wherein the first subscriber authentication information comprises a password provided to the head end by the subscriber and the unique identifier of the data communication device is a number provided to the head end by the data communication device associated with the subscriber.

23. The method of claim 15, wherein the data communications device of the subscriber of the cable data network includes a cable data receiver for receiving said digital data, wherein said data communications device is uniquely identified by the unique identifier.

24. In a cable data delivery network for delivering digital data to a host location upon a subscriber initiated request, an apparatus for authenticating that the subscriber is authorized to use said network, said apparatus comprising:

a network manager including at least one database of authorized users and authorized unique identifiers for each of a plurality of authorized data communication devices and a validation agent, said validation agent further comprising:

logic to authorize the subscriber to access a first communications path by comparing first subscriber authentication information received from a data communication device associated with the host location with at least part of the at least one database comprising the authorized users, wherein said first subscriber authentication information includes a subscriber USERID and a subscriber password, wherein said at least one database includes an associated USERID and password for each of said authorized users, wherein said validation agent authorizes said subscriber to use said first communications path in accordance with a comparison of said subscriber USERID and said subscriber password to USERIDS and passwords stored in said at least one database, the first communications path providing at least a portion of connectivity between the host location and a head end of the cable data delivery network; and logic to authorize the subscriber to access a second communications path, responsive to the first communications path authorization, by comparing a unique identifier of the data communication device that is received from the data communication device with at least part of the at least one database comprising the authorized unique identifiers for each of the plurality of data communication devices, the second communications path providing at least a portion of connectivity between the host location and the head end of the cable data delivery network.

25. The apparatus of claim 24, wherein said at least one database further includes authorized identifying numbers for each of a plurality of dial up devices including said dial up device.

26. The apparatus of claim 25, wherein said validation agent authorizes said dial up device to receive said digital data over the second communications path in accordance with a comparison of said identifying number of said dial up device with said identifying numbers stored in said at least one database.

27. The apparatus of claim 24, wherein the first communications path is a public switched telephone network (PSTN) link.

28. The apparatus of claim 24, wherein the first communications path is bi-directional.

29. The apparatus of claim 24, wherein the second communications path is a radio frequency (RF) cable link.

30. The apparatus of claim 24, wherein the data delivery is restrained until authorization is completed.

31. The apparatus of claim 24, wherein the first subscriber authentication information comprises a password provided to the validation agent by the subscriber and the unique identifier of the data communication device is a number provided to the validation agent by the data communication device associated with the host.

* * * * *